United States Patent
Howard et al.

(10) Patent No.: US 6,232,012 B1
(45) Date of Patent: *May 15, 2001

(54) HIGH RELIABILITY ELECTROCHEMICAL CELL AND ELECTRODE ASSEMBLY THEREFOR

(75) Inventors: William G. Howard, Roseville, MN (US); Roger W. Kelm, New Richmond, WI (US); Douglas J. Weiss, Plymouth, MN (US); Ann M. Crespi, Minneapolis, MN (US); Fred J. Berkcwitz, Champlin, MN (US); Paul M. Skarstad, Plymouth, MN (US)

(73) Assignee: Medtronic, Inc., Minneapolis, MN (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/067,600

(22) Filed: Apr. 28, 1998

Related U.S. Application Data

(60) Continuation of application No. 08/430,532, filed on Apr. 27, 1995, now Pat. No. 6,051,038, which is a division of application No. 08/155,410, filed on Nov. 19, 1993, now Pat. No. 5,439,760.

(51) Int. Cl.$^7$ .................................................. H01M 4/00

(52) U.S. Cl. ............................ 429/94; 429/129; 429/163; 429/186

(58) Field of Search ............................. 429/94, 129, 185, 429/211, 163, 186

(56) References Cited

U.S. PATENT DOCUMENTS

| | | |
|---|---|---|
| 2,928,888 | 3/1960 | Vogt . |
| 3,373,060 | 3/1968 | Gray . |
| 3,395,043 | 7/1968 | Shoeld . |
| 3,558,358 | 1/1971 | Ropp . |
| 3,703,417 | 11/1972 | Rosa . |
| 3,734,778 | 5/1973 | Huf . |
| 4,000,351 | 12/1976 | Hug . |
| 4,051,304 | 9/1977 | Snook . |
| 4,105,832 | 8/1978 | Sugalski . |
| 4,184,012 | 1/1980 | Barrella . |
| 4,332,867 | 6/1982 | Tsuda . |
| 4,333,994 | 6/1982 | Urry . |
| 4,539,271 | 9/1985 | Crabtree . |
| 4,550,064 | 10/1985 | Yen . |
| 4,565,752 * | 1/1986 | Goebel et al. ........................ 429/94 |
| 4,663,247 | 5/1987 | Smilanich . |
| 4,668,320 | 5/1987 | Crabtree . |

(List continued on next page.)

Primary Examiner—Carol Chaney
Assistant Examiner—Raymond Alejandro
(74) Attorney, Agent, or Firm—Thomas F. Woods; Girma Wolde-Michael; Harold R. Patton

(57) ABSTRACT

An electrochemical cell and electrode assembly in which an alkali metal anode and a cathode assembly are wound together in a unidirectional winding having substantially straight sides such that the winding will fit into a prismatic cell. The anode and cathode are arranged in the winding to provide for even utilization of reactive material during cell discharge by placing cathode and anode material in close proximity throughout the electrode assembly in the proportions in which they are utilized. The winding also contributes to even utilization of reactive material by employing multiple tabs on the cathode assembly to ensure that cathode material is evenly utilized throughout the electrode assembly during cell discharge and also so that connections to the tabs are readily made.

2 Claims, 6 Drawing Sheets

U.S. PATENT DOCUMENTS

| | | |
|---|---|---|
| 4,709,472 | 12/1987 | Machida . |
| 4,830,940 | 5/1989 | Keister . |
| 4,863,815 | 9/1989 | Chang . |
| 4,963,445 * | 10/1990 | Marple et al. .......................... 429/94 |
| 4,964,877 | 10/1990 | Keister . |
| 5,008,165 | 4/1991 | Schmode . |
| 5,017,442 | 5/1991 | Watanabe . |
| 5,053,297 | 10/1991 | Yamahira . |
| 5,130,211 * | 7/1992 | Wilkinson et al. ................... 429/198 |
| 5,322,746 * | 6/1994 | Wainwright ............................ 429/60 |
| 5,434,017 * | 7/1995 | Berkowitz et al. ..................... 429/94 |
| 5,439,760 * | 8/1995 | Howard et al. ......................... 429/94 |
| 5,486,215 * | 1/1996 | Kelm et al. .......................... 29/623.1 |
| 5,660,950 * | 8/1997 | Bailey ................................. 429/212 |

\* cited by examiner

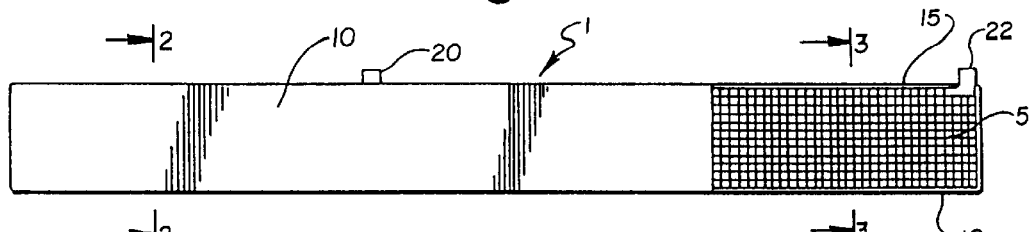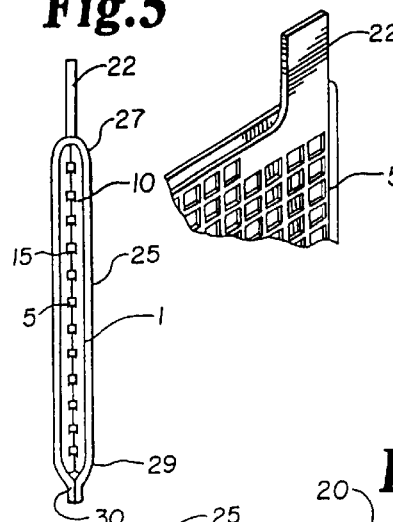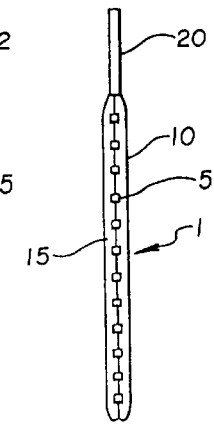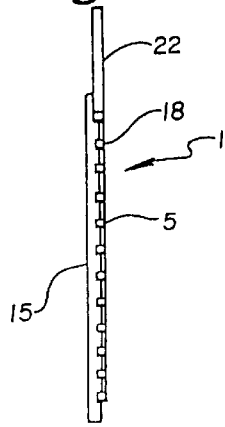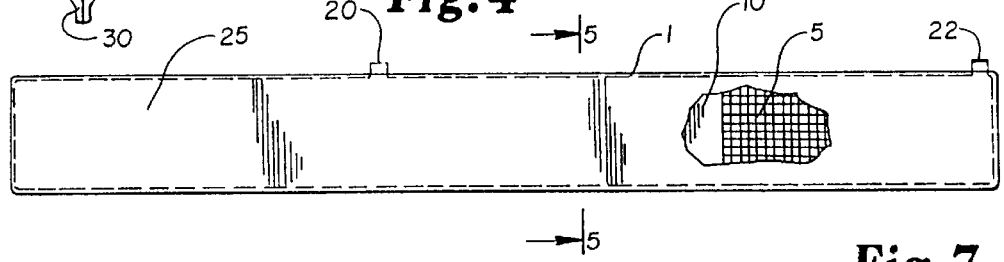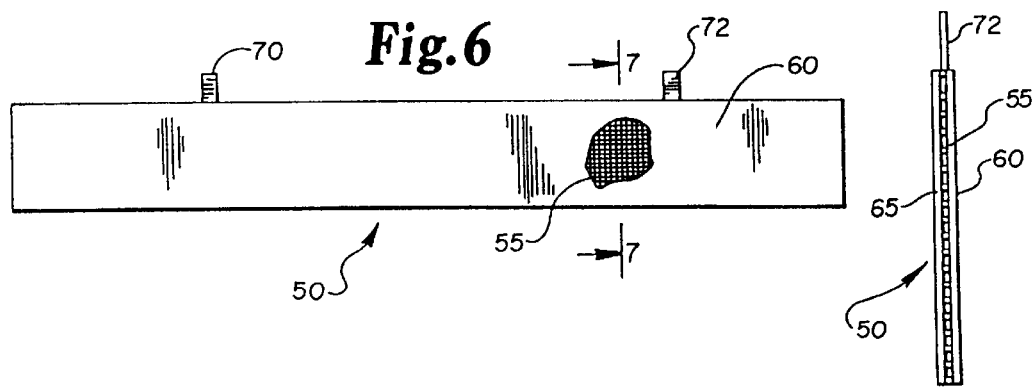

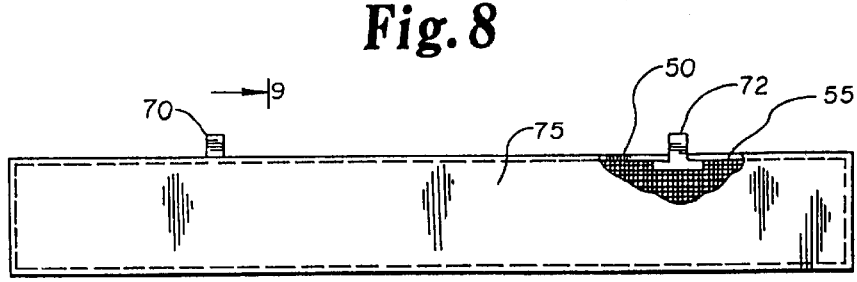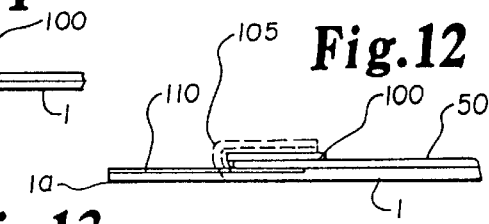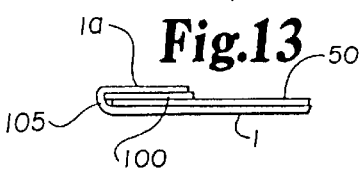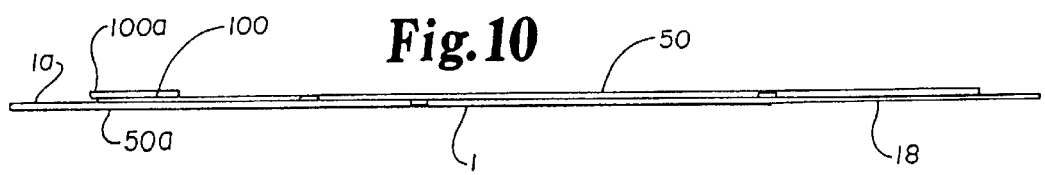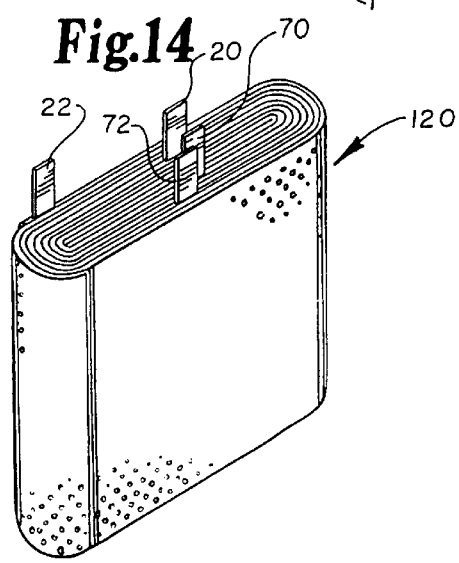

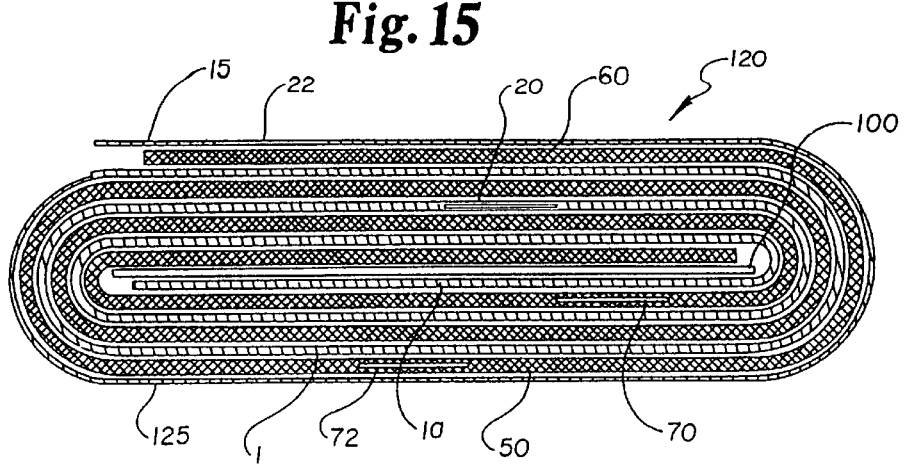
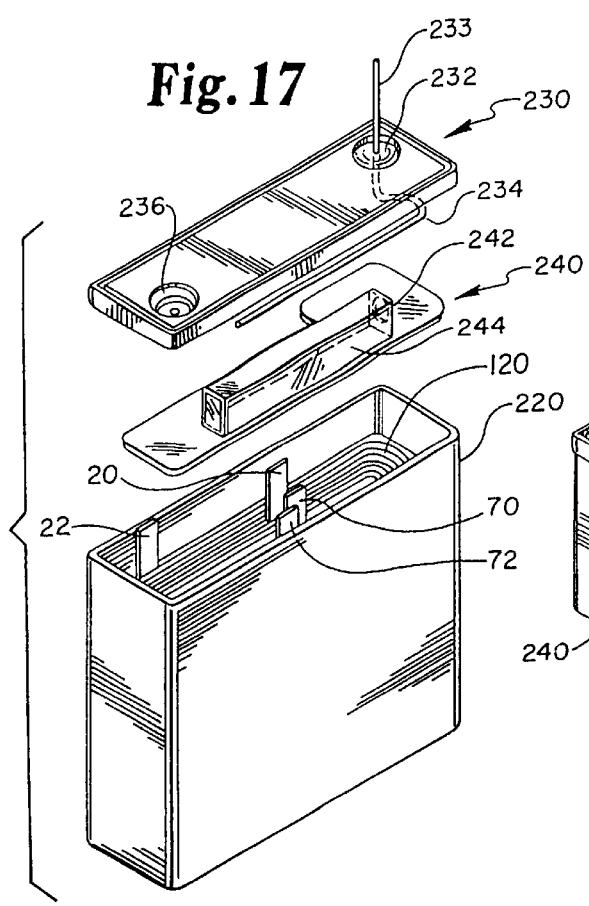
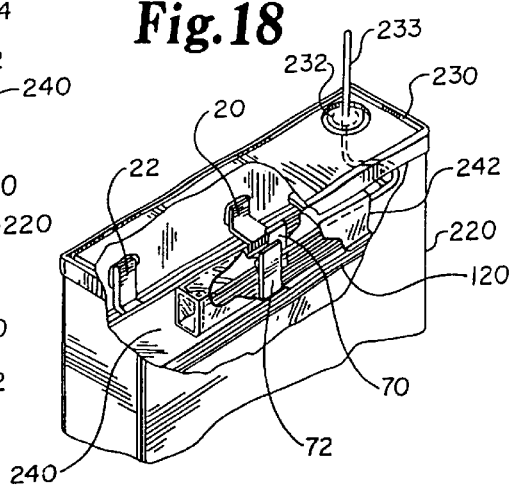

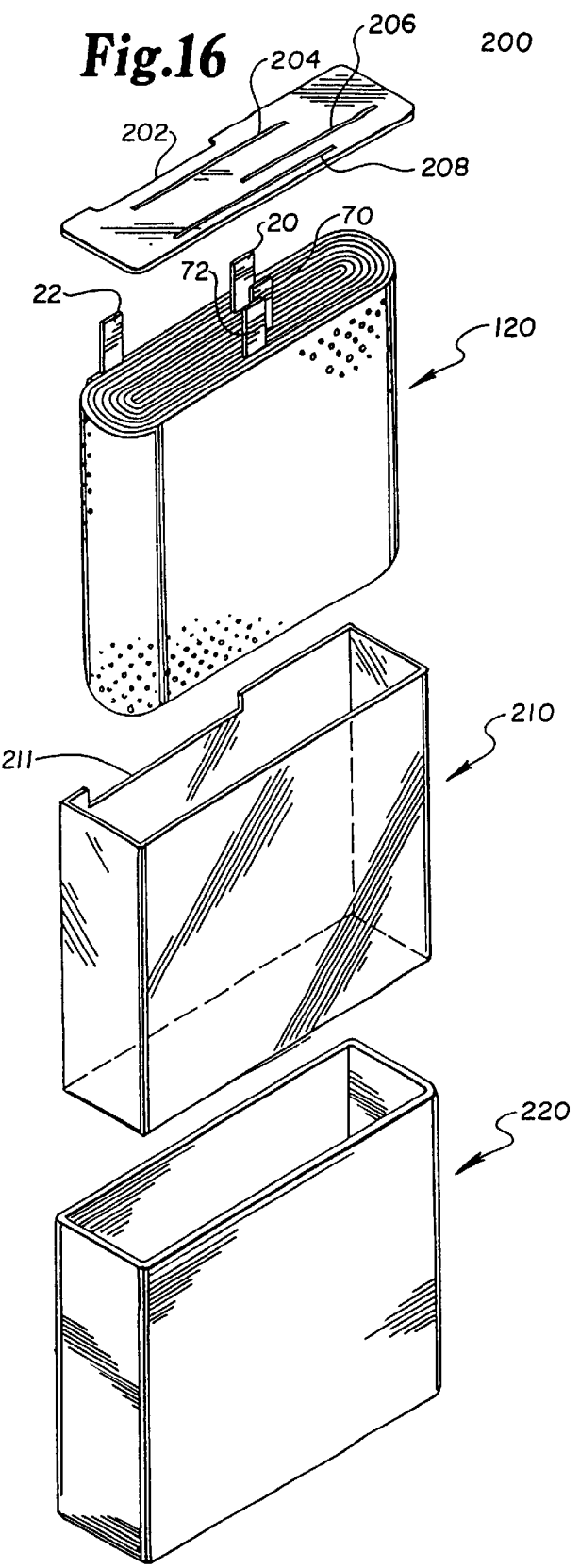

HIGH RELIABILITY ELECTROCHEMICAL CELL AND ELECTRODE ASSEMBLY THEREFOR

This application is a continuation application of U.S. patent appln. Ser. No. 08/430,532 filed Apr. 27, 1995 now U.S. Pat. No. 6,051,038 for "High Reliability Electrochemical Cell and Electrode Assembly Therefor" to Howard et al. which is a divisional application of U.S. patent appln. Ser. No. 08/155,410 filed Nov. 19, 1993 for "High Reliability Electrochemical Cell and Electrode Assembly Therefor" to Howard et al. now U.S. patent appln. Ser. No. 5,439,760.

BACKGROUND OF THE INVENTION

This invention relates to electrochemical cells having a lithium anode and more particularly to a primary lithium electrochemical cell adapted for high reliability and high rates of current discharge.

Implantable cardiac defibrillators are used to treat patients suffering from ventricular fibrillation, a chaotic heart rhythm that can quickly result in death if not corrected. In operation, the defibrillator device continuously monitors the electrical activity of the heart of the patient, detects ventricular fibrillation, and in response to that detection, delivers appropriate shocks to restore a normal heart rhythm. Shocks as large as 30–35 joules may be needed. Shocks are delivered from capacitors capable of providing that energy to the patient in a fraction of a second. In order to provide timely therapy to the patient after the detection of ventricular fibrillation, it is necessary to charge the capacitors with the required amount of energy in only a few seconds. Thus, the power source must have a high rate capability to provide the necessary charge to the capacitors, it must also possess low self-discharge in order to have a useful life of many months, and it must be highly reliable to provide an urgently needed therapy whenever necessary. In addition, since cardiac defibrillators are implanted, the battery must be able to supply energy from a minimum packaged volume.

One battery suitable for defibrillator use is disclosed in U.S. Pat. No. 4,830,940 to Keister et al, which patent is incorporated herein by reference. As disclosed therein, the anode material of the battery is lithium and the reactive cathode material is silver vanadium oxide. The anode is constructed in a serpentine-like fashion with cathode plates inserted between each of the convolutions thereof on both sides thereof. The electrolyte for a lithium battery or cell is a liquid organic type which comprises a lithium salt and an organic solvent. Both the anode and the cathode plates are encapsulated in an electrically insulative separator material. However, a disadvantage of this battery design is that the serpentine anode is not efficiently used since anode material at the bends is not faced by cathode material and is therefore not fully utilized. An improvement which addresses this problem is disclosed in U.S. Pat. No. 5,147,737 to Post et al, in which the active material on the serpentine-type electrode is positioned so that the sections of the serpentine-like structure which do not face cathode plates do not contain anode active material. However, the serpentine bends of the anode are still present to the detriment of volumetric efficiency. Additional problems with these battery designs include the number of piece parts and connections required to make the battery which can affect both the manufacturability and the reliability of the battery; and the difficulty of achieving good current distribution and utilization of reactive material due to the unmatched configurations of the anode and cathode.

Conventional lithium batteries can also employ an electrode body in which anode and cathode elements are combined in spiral wound form. A strip sheet of lithium or lithium alloy comprises the anode, a cathode material supported on a charge collecting metal screen comprises the cathode, and a sheet of non-woven material separates the anode and cathode elements. These elements are combined and wound to form a spiral. Typically, the battery configuration for such a wound electrode would be cylindrical. For example, such configurations can be found in U.S. Pat. Nos. 3,373,060; 3,395,043; 3,734,778; 4,000,351; 4,184,012; 4,332,867; 4,333,994; 4,539,271; 4,550,064; 4,663,247; 4,668,320; 4,709,472; 4,863,815; 5,008,165; 5,017,442; and 5,053,297. Unlike the battery of the '940 patent, there need not be anode material which is not mated to cathode material. Such designs therefore have the potential for an improved match between the cathode and anode components and improved uniformity of anode and cathode utilization during discharge. However, cylindrical cells would not achieve the same space utilization inside the case of an implantable defibrillator as a prismatic cell shape.

It has also been known to adapt wound electrodes to a prismatic case configuration by departing from a true spiral winding. For example, U.S. Pat. No. 2,928,888 discloses in FIGS. 5a and 5b therein an oblong electrode assembly wound on an elongated mandrel for use in a rectangular case. Also, for example, U.S. Pat. No. 4,051,304 discloses in FIG. 2 therein another oblong wound electrode assembly for use in a rectangular case. However, these patents do not indicate that such structures could be advantageously used for a high current rate capability lithium battery or that they provide a uniform utilization of reactive anode and cathode material during discharge.

It is therefore an object of the present invention to provide a high current rate capability lithium battery having a coiled electrode suitable for use in a prismatic case.

It is also an object of the present invention to provide a high current rate capability lithium battery which provides uniform utilization of cathode and anode materials during discharge.

It is also an object of the present invention to provide a high current rate capability lithium battery for use in implantable cardiac defibrillators which employs a reduced number of piece parts and welds when compared with prior art devices.

SUMMARY OF THE INVENTION

These and other objects are accomplished by the electrochemical cell and electrode assembly of the present invention. We have discovered an electrode assembly for an electrochemical cell which includes an alkali metal anode and a cathode assembly which are wound together in a unidirectional winding having substantially straight sides such that the winding will fit into a prismatic cell. The anode includes an elongated strip of alkali metal having a first portion with a first uniform thickness of alkali metal and a second portion with a second, lesser uniform thickness of alkali metal and at least one connector tab in electrical contact with the alkali metal on an edge of the anode. The cathode assembly includes a cathode current collector having preferably two connector tabs spaced apart on an edge of the current collector and a cathode material bonded to the current collector at a uniform density of reactive material. The cathode assembly is shorter than the anode so that the anode and cathode can be wound by superimposing them with a separator material placed between them and then winding them by making an initial fold in the anode over the end of the cathode assembly and a mandrel to establish the length of the straight sides of the winding. The anode and cathode are then wound together unidirectionally until at the outermost portion of the winding the thin portion of the anode is the outer layer of the electrode assembly. The mandrel is then removed to allow both sides of the initial portion of the anode assembly to contact the cathode assembly. This electrode assembly allows for even utilization of reactive material by placing cathode and anode material in close proximity throughout the electrode assembly in the proportions in which they are utilized. It preferably also contributes to even utilization of reactive material by employing multiple tabs on the cathode assembly to ensure that cathode material is utilized throughout the electrode assembly. This is particularly important in the cathode since the current collector is being relied upon to provide conductivity throughout the cathode; conductivity that may not be inherently good in metals chosen largely for their corrosion-resistance. Preferably, the tabs are placed on the anode and cathode such that in the final winding the anode tabs are on one side of the winding while the cathode tabs are on the opposite side of the winding. This facilitates connection between the electrode and other battery components and avoids short circuits.

In this assembly, it is also preferred to include various structures to promote additional reliability for implantable medical devices. For example, the anode preferably also includes an anode current collector which is bonded on a first side to a length of reactive anode metal having a uniform thickness and on a second side to a second, shorter length of reactive anode metal having a uniform thickness. In the winding, the second side of the current collector with the shorter length of reactive metal faces the outside of the winding since reactive material is not needed on the outside of the last turn of the winding. Also, for example, the anode and cathode are preferably both enclosed within a pouch of separator material having an opening through which the connector tab of the electrode projects. The separator pouch then prevents the transport of stray material into the cell which could cause a short circuit and the double thickness of separator between anode and cathode elements better resists damage during the winding process that could otherwise cause shorting during battery operation.

When the electrode assembly described above is incorporated in an electrochemical cell, the electrode assembly can be placed into a prismatic battery case having parallel, substantially straight sides. If the case is made of metal, a closely-fitting preform of non-conductive material should be placed inside the case between the electrode assembly and the metal of the case to insulate the elect-rode elements from the case. A feedthrough can be attached to the case by an insulative seal and connected to the tabs of the either the anode or cathode of the electrode assembly. The tabs of the other electrode of the assembly can be welded to a second feedthrough or to the case.

The actual winding process for the electrode assembly can be done by hand winding or by machine winding. A thin mandrel is used in the winding process and is removed following the completion of the winding process.

BRIEF DESCRIPTION OF THE DRAWINGS

FIG. 1 is a side view of an anode component used in the present invention.

FIG. 2 is a cross sectional view of a first portion of the anode of FIG. 1.

FIG. 3 is a cross sectional view of a second portion of the anode of FIG. 1.

FIG. 3A is a detail view of the electrode tab of the anode of FIG. 1.

FIG. 4 is a partially cut-away side view of the combined anode and separator used in the present invention.

FIG. 5 is a is a cross sectional view of the anode and separator of FIG. 4.

FIG. 6 is a partially cut-away side view of the cathode assembly used in the present invention.

FIG. 7 is a cross sectional view of the cathode assembly of FIG. 6.

FIG. 8 is a partially cut-away side view of the combined cathode assembly and separator used in the present invention.

FIG. 9 is a cross sectional view of the combined cathode assembly and separator of FIG. 8.

FIG. 10 is a top view of the mandrel, cathode assembly and anode assembly ready to be wound.

FIG. 11 is a top view of the end portion of the mandrel, cathode assembly and anode assembly of FIG. 10 showing the direction of the bend for the anode about the cathode and mandrel.

FIG. 12 is a top view of the end portion of the mandrel, cathode assembly and anode assembly of FIG. 11 showing the use of additional separator material at the anode bend.

FIG. 13 is a top view of the end portion of the mandrel, cathode assembly and anode assembly showing the completed bend from FIG. 11.

FIG. 14 is a perspective view of the completed electrode assembly according to the present invention.

FIG. 15 is a top view of the windings of the electrode assembly (not showing the separator material between the winding elements) and the position of the mandrel in the windings prior to its removal.

FIG. 16 is an exploded perspective view showing the insertion of the electrode assembly into the battery case together with insulator materials.

FIG. 17 is an exploded perspective view showing the application of the insulator and case top to the case and electrode assembly of FIG. 16.

FIG. 18 is a partial cut-away perspective view of the completed battery showing the connection of the tabs of the electrode with the case elements.

DETAILED DESCRIPTION OF THE INVENTION

Figure 19:
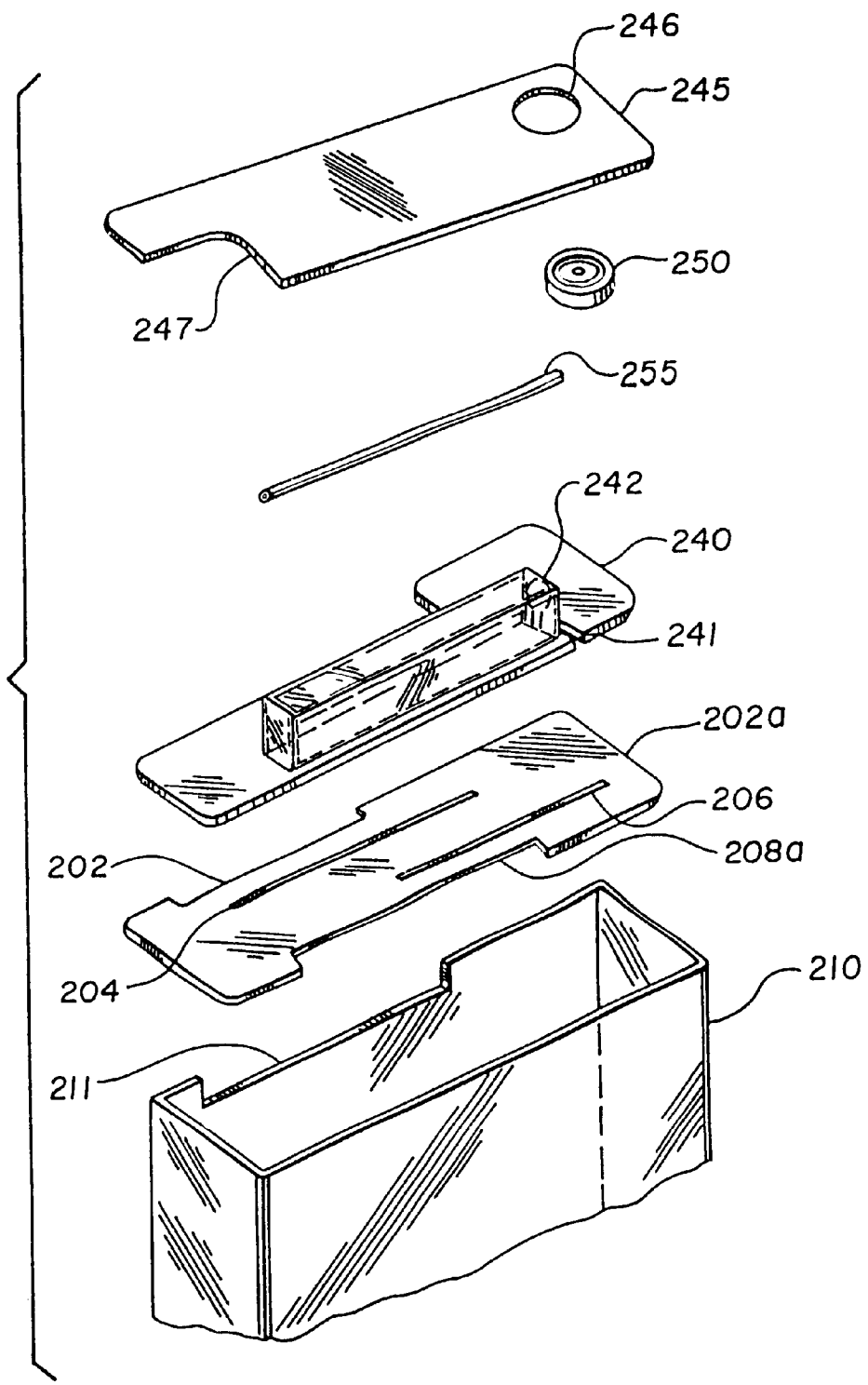
FIG. 19 is a partial cut-away perspective view of the isolation components for the battery.

Referring now to the drawings, FIGS. 1–6 show the anode portion of the electrode assembly. In FIG. 1, the elongated anode assembly 1 is shown including a current collector 5 which has a first layer of alkali metal 10 on one side and a second layer of alkali metal 15 on the other side. The alkali metal 10, 15 is preferably lithium metal or an alloy of lithium pressed onto the screen current collector 5. FIG. 2 shows in cross section the sandwich structure of the anode assembly 1 with the current collector 5 interposed between the first and second layers of alkali metal 10, 15. FIG. 3 shows in cross section that the anode assembly 1 has at one end 18 only alkali metal 15 on one side of the current collector 5. The bare portion of the current collector 5 will form the outer wrap of the wound electrode assembly since no active material is required for that surface. The current collector 5 is a conductive metal that is corrosion-resistant when associated with the alkali metal 10, 15, preferably nickel, copper or an alloy of nickel or copper. First and second connector tabs 20, 22 project from the edge of the current collector although a single connector tab may also be used since the conductivity of lithium metal on a nickel or copper current collector is capable of providing adequate current distribution at high discharge rates if the current collector has an adequate conductive cross sectional area for its length. Additional connector tabs may also be added if improved reliability of connections is desired. The connector tabs 20, 22 can be incorporated into the current collector 5 when formed as shown in FIG. 3A. The current collector 5 is preferably made by an etching process which provides smooth edges on the current collector 5 and thereby eliminates stray metal pieces which may otherwise poke through the separator material and cause shorting of the battery. An alternative to the anode assembly 1 depicted is to dispense with the current collector 5 in favor of an anode which is made up almost entirely of an alkali metal or alkali metal alloy. In such a configuration, the alkali metal would be formed in a thicker cross-section at one end than at another and the connector tabs would be connected directly to the alkali metal.

FIGS. 5 and 6 show the anode assembly 1 covered by separator 25. Separator 25 forms a pocket around the anode assembly 1 since it folds over at the top edge 27 and conforms to the anode assembly 1 until it reaches the bottom edge 29 where it is joined to itself at a seal 30. Slits (not shown) can be cut in the separator 25 to allow the connector tabs 20, 22 to project through the separator 25. The material used in the separator 25 can be a commercially available microporous polyolefin (i.e. polyethylene or polypropylene) separator material such as Celgard 4560 (a microporous/nonwoven laminate material made by Hoechst Celanese). Preferably, the nonwoven side of separator 25 is pressed into the surface of the alkali metal 10, 15 of the anode assembly 1 such that the alkali metal deforms into intimate contact with the separator 25 and bonds to the separator 25.

This deformation bonding can be accomplished by pressing the nonwoven side of separator 25 onto the alkali metal 10, 15 in a hydraulic press. It can be accomplished in the same pressing operation in which the alkali metal 10, 15 is pressed onto the current collector 5 as described above. In preparation for the pressing operation, the alkali metal 10, 15 sheets are cut to size, weighed and placed on either side of the current collector 5 in a die. The die and the anode components 5, 10, 15 are then placed in a rolling fixture which presses the alkali metal 10, 15 onto the current collector at a pressure sufficient to hold them in place. The separator 25 is then placed around the anode assembly 1 and is pressed onto the alkali metal 10, 15 on the anode assembly 1 by a hydraulic press at a pressure that deforms the anode metal into intimate contact with the separator. For example, about 400 psi could be used.

The seal 30 for the separator can be a heat seal made by conventional heat sealing equipment.

Referring now to FIGS. 6–9 which show the elongated cathode assembly 50, the cathode assembly 50 includes a current collector 55 onto which layers 60, 65 of a cathode material are pressed. The cathode assembly 50 has essentially the same width as the anode assembly 1. The cathode material includes a solid reactive cathode ingredient such as manganese dioxide, $V_6O_{13}$, silver vanadium oxide, or $CF_x$ and dry mixtures including such materials together with such binders and conductivity enhancers as may be desirable. Preferably, the silver vanadium oxide used is that disclosed in U.S. Pat. No. 5,221,453 issued to Crespi. For example, in a battery employing silver vanadium oxide as a reactive cathode ingredient, about 5% PTFE could be added as a binder along with about 2% carbon black and 2% graphite as conductivity enhancers. The particulate ingredients can be mixed together, dried to a desired moisture content, placed in a uniform layer over the current collector 55 and then dry pressed in a high pressure press to form each of the cathode material layers 60, 65. Alternatively, wet processes known in the art could also be used in which a wet mix of cathode material is deposited on the current collector 55 and then dried and rolled to form each of the cathode material layers 60, 65. Connector tabs 70, 72 project from the edge of the current collector 55 in substantially the same manner as in the anode assembly 1 described above. The current collector 55 is a conductive metal that is corrosion-resistant when associated with the cathode material, preferably titanium, stainless steel or an alloy of titanium. A separator 75 forms a pocket around the cathode assembly 50 in the same manner as that for the anode assembly 1 above and is provided with a seal 80. The material used in the separator 75 can be the same commercially available microporous polyolefin (i.e. polyethylene or polypropylene) separator material as is used for the anode assembly 1 and the seal 80 can be a heat seal of the material. Preferably, the separator 75 for the cathode assembly 50 is made slightly larger than the cathode assembly to allow for swelling of the cathode material 60, 65 as the battery is discharged and to keep it from splitting as the battery is discharged. This is in contrast with the separator 25 for the anode assembly 1 which can be tightly fitting around the anode assembly 1.

FIGS. 10–13 indicate how the winding process is to be started. FIG. 10 shows the anode assembly 1 which has been aligned with the cathode assembly 50 and the mandrel 100 in order to commence the winding operation. The separators 25, 75 for these components are in place around the anode assembly 1 and the cathode assembly 50 respectively during the winding operation although they are not shown. It should be noted that the anode assembly 1 is longer than the cathode assembly 50 and has been positioned at one end 1a to overlap the corresponding end 50a of the cathode assembly 50. The end 50a of the cathode assembly 50 has been positioned slightly behind the edge 100a of the mandrel 100. The anode assembly 1 has also been placed against the cathode assembly 50 such that the alkali metal layer 15 is against cathode material layer 60 at the end 18 of the anode assembly 1. This will ensure that the outer winding of the electrode assembly has an alkali metal layer 15 facing the cathode material 60 and the bare current collector 5 at the end 18 will face outward. As shown in FIGS. 11 and 13, the winding process is commenced by bending end 1a of the anode assembly 1 onto the mandrel 100. As shown, the bend 105 also bends the anode assembly 1 around the end of the cathode assembly. A minor alternative (not shown) to this bending procedure that may be useful when making the bend by hand is to first bend the anode assembly 1 over the mandrel 100 in the absence of the cathode assembly 50 (but including a spacer of equivalent thickness to the cathode assembly 50 to make the proper bend radius on the anode assembly 1) and then to remove the spacer and slip the cathode assembly 50 between the mandrel 100 and the anode assembly.

It may be desirable to place additional separator material between the anode assembly 1 and the cathode assembly 50 and between the anode assembly and the mandrel 100 to provide smoother bends. This can be accomplished as shown in FIG. 12 where additional separator material 110 has been placed over the anode assembly 1 and between the anode assembly 1 and cathode assembly 50 at the point where the bend 105 is to be made. A most convenient method for adding the additional separator material 110 is to merely make a longer separator 25 and extend the separator 25 for the anode assembly 1 beyond the length of the anode assembly 1 at the appropriate end 1a and to simply fold the separator back along the anode assembly 1, thus providing a triple thickness of separator material at the point of the bend 105.

The winding then proceeds by winding the combined anode assembly 1 and cathode assembly 50 around the mandrel unidirectionally until the electrode assembly is completed. It is essential that the winding process be carried out by a method which will result in consistent winding tension. Uneven winding tension can cause higher and lower resistance paths during discharge which produces uneven current distribution and can alter the location of the connector tabs 20, 22, 70 and 72 in the final winding which can make connections difficult. Even winding tension can be accomplished by careful hand winding or by machine winding. Machine winding, which can produce greater battery-to-battery uniformity is preferred. FIG. 14 shows the completed electrode assembly 120 with connector tabs 20, 22, 70 and 72 projecting from the electrode assembly 120. Preferably, the connector tabs 20, 22 associated with the anode are on one side of the electrode assembly 120 while the connector tabs 70, 72 associated with the cathode are spaced apart from the anode connector tabs 20, 22 on the opposite side of the electrode assembly as shown. This helps to avoid inadvertent shorts in the completed battery. Also, preferably, the connector tabs are located such that they are positioned close to their intended connection point with the feedthrough or case and with no overlap between the cathode tabs or between the anode tabs in order to facilitate making the individual welded connections.

FIG. 15 shows the final arrangement of the windings in the electrode assembly 120 together with the mandrel 100 (the separators 25, 75 and current collectors 5, 55 are not shown) Consistent winding of the anode assembly 1 and the cathode assembly 50 will result in an electrode assembly 120 in which the mandrel 100 determines the length of the straight sides of the electrode assembly 120 and in which the final anode layer 125 has alkali metal 15 only facing the cathode material 60. As described above, if the current collector 5 is eliminated in the design, then the final anode layer 125 is simply made of anode material at half of the thickness of the rest of the anode.

Removal of the mandrel 100 will bring the first end 1a of the anode assembly 1 into contact on both sides with the cathode assembly 50 and will complete the electrode assembly 120. It will be appreciated that in order to provide close proximity between anode assembly 1 and cathode assembly 50 at the start of the winding, that the mandrel should be very thin. For example, a stainless steel mandrel about 0.010 inch thick could be used although thicker mandrels could be used if additional stiffness were required.

As will be appreciated by those skilled in the art, the number of windings chosen for the battery will be determined by the required rate of discharge and the required capacity of the battery. Increasing the number of windings will provide an increased ability to discharge at a high rate but will tend to reduce the capacity per unit volume for the battery.

Assembly of the electrode assembly 120 into a battery is shown in FIGS. 16–18. In FIG. 16, a coil insulator 200 is placed onto the electrode assembly 120. The coil insulator includes a notch 202 to accommodate anode connector tab 22 and slits 204, 206, 208 to accommodate anode connector tab 20, and cathode connector tabs 70, 72 respectively. The electrode assembly 120 is also inserted into an insulative case liner 210. The case liner 210 preferably extends at its top edge above the edge of the electrode assembly 120 in order to provide an overlap with other insulative elements. If so, it may include a notch 211 on one side in order to allow the easy connection of the anode connector tabs 20, 22 to the case 220. The coil insulator 200 and case liner 210 are preferably made from a polyolefin polymer or a fluoropolymer such as ETFE or ECTFE. The electrode assembly 120 and case liner 210 are then inserted into a prismatic case 220, preferably made of stainless steel. In FIG. 17 a case cover 230 and a pin insulator 240 are shown along with the electrode assembly 120 and prismatic case 220. The case cover 230 has a glassed in feedthrough 232 and feedthrough pin 233 extending through an aperture in the case cover 230 that has a bend 234 which is intended to place the feedthrough 232 in alignment with the cathode connector tabs 70, 72. The case cover 230 also has a fill port 236. The case cover 230 is made from stainless steel and the feedthrough pin 233 is preferably niobium or molybdenum. The pin insulator 240 has an aperture 242 leading into a raised portion 244 which receives the feedthrough pin 233 and insulates the feedthrough pin 233 from contact with the case cover 230. In combination with one side of the coil insulator 200, which is immediately below the pin insulator 240, the raised portion forms a chamber which isolates the cathode connections. Additional insulation in the form of tubing or a coating (not shown) may also be included on the feedthrough pin 233 and feedthrough 232 at locations which will not be welded to further insulate the feedthrough pin 233 and feedthrough 232 and also an additional cover insulator (not shown) could be applied to the underside of the case cover 230 to provide additional insulation for the case cover 230. The feedthrough pin 233 is welded to the cathode connector tabs 70, 72 as shown in FIG. 18 and the anode connector tabs 20, 22 are bent into an "L" shape as shown in FIG. 18 and are welded to the side of the case 220 thereby mating the metal case 220 one terminal or contact for the battery (i.e. a case negative design). The feedthrough pin 233 is then inserted through a split (not shown) in the pin insulator 240 until it projects through the aperture 242 of the pin insulator 240. The electrode assembly 120 may be out of the case 220 during some of the welding and bending operations. All electrode welding operations should take place in an inert gas atmosphere. The case cover 230 is then welded to the case 220 to seal the electrode assembly 120 in the case.

Figure 20:
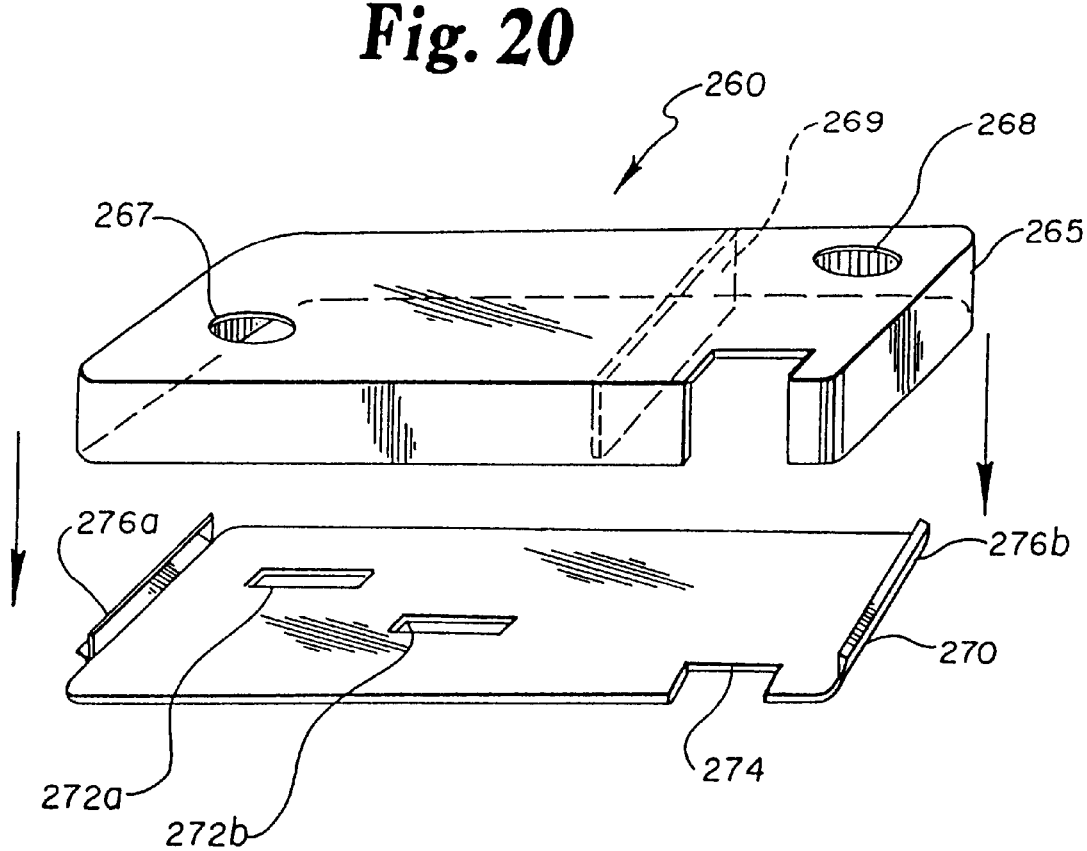
FIG. 20 is a perspective view of an alternative form for isolation components for the battery.

Referring now also to FIG. 19, the isolation components for the battery are shown in greater detail. A cover insulator 245 is adapted to fit under the case cover 230 with an aperture 246 to accommodate the feedthrough 232 and feedthrough pin 233 and a cut-away portion 247 to accommodate the fill port 236. The cover insulator 245 is applied to the underside of the case cover 230. A feedthrough insulator 250 then slides over the feedthrough pin 233 and over the feedthrough 232 into contact with the cover insulator 245. Once the feedthrough insulator 250 is in place, a tubular insulator 255 is slipped over the feedthrough pin 233 until it contacts the glass of the feedthrough 232. The feedthrough pin 233 is then bent into its desired configuration for connection with cathode connector tabs 70, 72 as shown in FIG. 17. The pin insulator 240 is shown with a split 241 which extends from the edge of the pin insulator 240 to the aperture 242. Again, the pin insulator 240 has an aperture 242 leading into a raised portion 244 or recess which receives the feedthrough pin 233 and the tubular insulator 255 over the feedthrough pin and insulates the feedthrough pin 233 From contact with the case cover 230 at the point where the feedthrough pin is welded to the cathode connector tabs 70, 72. The split 241 allows the pin insulator 240 to be placed on the feedthrough pin 233 after the feedthrough pin has been welded to the cathode tabs 70, 72. The tubular insulator 255 therefore extends through the aperture 242, thereby preventing any discontinuity in the isolation of the cathode connector tabs 70, 72 and feedthrough pin 233 from elements at anode potential. A coil insulator 202a is shown With a notch 202 to accommodate anode connector tab 22 and slits 204, 206 to accommodate anode connector tab 20, and cathode connector tab 70 respectively. A notch 208a is also provided to accommodate cathode connector tab 72 in place of the slit 208 shown in FIG. 16. The electrode assembly 120 is also inserted into an insulative case liner 210. All of the case isolation components including the cover insulator 245, the feedthrough insulator 250, the tubular insulator 255, the pin insulator 240, the coil insulator 202a and the case liner 210 are molded or extruded self-supporting polymeric parts preferably made from a polyolefin polymer or a fluoropolymer such as ETFE or ECTFE. The result of this insulator configuration is that the cathode connections are thoroughly isolated from the portions of the battery at anode potential and that the feedthrough connection is thoroughly isolated from stray particles of material from the cathode and from lithium particles that may form during discharge of the battery. It will be appreciated that additional improvements to this insulator configuration can be achieved by improving the fit between insulative components to provide better isolation of anode and cathode elements. For example, the aperture 242 on the pin insulator 240 and the tubular insulator 255 could be sized to be tightly fitting components or the feedthrough pin 233 could be fitted with mating insulator parts that would provide a snap fit which would obviate any migration of stray battery materials through the aperture 242. Alternative configurations of this type can be similar to that shown in FIG. 20. In FIG. 20, a snap fit isolation system 260 is shown which can reduce the number of isolation components in the battery. The snap fit isolation system 260 can consist of two principal components, a top component 265 and a bottom component 270, both components 265, 270 made from insulative plastic material by injection molding. These components 265, 270 can be used to replace components 202a, 240 and, optionally, 245 shown in FIG. 19. The bottom component 270 includes aperatures 272a and 272b which can accommodate Too cathode connector tabs and a notch 274 which can accommodate an anode connector tab and also provide a passageway from the fill port 236 into the remainder of the battery case to facilitate filling of the battery with electrolyte. Also shown are hooks 276a, 276b which are adapted to mate with the top component 265 to make a secure snap fit between the too component 265 and bottom component 270. Many other structures for making a secure snap fit between components 265, 270 could also be used. Such structures are well known for molded plastic parts. In addition, one of such hooks 276a, 276b could be omitted in favor of a molded hinge which would join one edge of each of the components 265, 270. The top component 265 includes a first aperature 267 adapted to accommodate the feedthrough pin 233 and a second aperature 268 aligned with the fill port 236 in order to allow the electrolyte to fill the battery through the fill port 236. The top component 265 also includes a partition wall 259 which, when the top and bottom components 265, 270 are joined, will separate the cathode connections and the feedthrough pin 233 from the fill port 236 and anode connection (only one anode tab would be used to connect the anode with the case in the embodiment shown) and also isolate the cathode connections and feedthrough pin 233 from other battery components. In essence, by joining the two components 265, 270, a separate compartment is created to house the feedthrough pin 233 and its connections with the cathode tabs.

Alternative embodiments in which the battery is a case positive design or case neutral design can readily be constructed in a like manner. For a case positive design, the cathode connector tabs 70, 72 can be rearranged to be welded to the case 220 while the anode connector tabs 20, 22 can be rearranged to be welded to the feedthrough pin 233. For a case neutral design, an additional feedthrough can be supplied that is connected to the anode connector tabs 20, 22.

An alternative embodiment can also be readily constructed by exchanging the relative positions of the cathode and anode materials. This reverses the electrode assembly construction so that the cathode assembly is made longer than the anode assembly with a portion of the current collector only having cathode material on one side to make up the outer layer of the winding and so that the winding is initiated by bending the cathode assembly over the mandrel. However, the embodiment described in greater detail above is preferred due to better rate capability and volumetric efficiency.

An appropriate electrolyte solution is introduced through the fill port 236 by a vacuum filling process and the fill port 236 is then sealed. The electrolyte solution can be a alkali metal salt in an organic solvent such as a lithium salt (i.e. 1.0 M $LiClO_4$ or $LiAsF_6$) in a 50/50 mixture of propylene carbonate and dimethoxyethane. The sealing process (not shown) may include, for example, making a first seal by pressing a plug into the aperture of the fill port 236 and making a second seal by welding a cap or disc over the fill port 236. Material utilized for leak checking hermetic seals may be included between the first and second seals.

It will be appreciated by those skilled in the art that while the invention has been described above in connection with particular embodiments and examples, the invention is not necessarily so limited and that numerous other embodiments, examples, uses, modifications and departures from the embodiments, examples and uses may be made without departing from the inventive concepts.

We claim:

1. An electrochemical cell including an electrode assembly fitted into a case having substantially straight sides, the electrode assembly comprising:

an elongated alkali metal anode; and an elongated cathode assembly;

said anode and said cathode assembly being wound together about a removable mandrel in an unidirectional winding to form said electrode assembly of said anode and said cathode assembly is inserted into and housed in said case.

2. The electrochemical cell of claim 1, wherein the cathode assembly further comprises a cathode current collector, an elongated strip of reactive cathode material bonded to the cathode current collector providing a uniform density of reactive material, and at least two cathode connector tabs attached at spaced apart locations to said cathode assembly to enable even utilization of cathode material.

* * * * *

UNITED STATES PATENT AND TRADEMARK OFFICE
CERTIFICATE OF CORRECTION

PATENT NO.   : 6,232,012 B1
DATED        : May 15, 2001
INVENTOR(S)  : Howard et al.

It is certified that error appears in the above-identified patent and that said Letters Patent is hereby corrected as shown below:

<u>Title page,</u>
Item [75] Inventors: "Wiliam G. Howard, Roseville, MN (US); Roger W. Kelm, New Richmond, WI (US); Douglas J. Weiss, Plymouth, MN (US); Ann M. Crespi, Minneapolis, MN (US); Fred J. Berkowitz, Champlin, MN (US); Paul M. Skarstad, Plymouth, MN (US)" should read -- Fred J. Berkowitz, Champlin, MN (US); William G. Howard, Roseville, MN (US) --

Signed and Sealed this

Eighth Day of January, 2002

*Attest:*

JAMES E. ROGAN
*Attesting Officer*     *Director of the United States Patent and Trademark Office*